Figure 4:
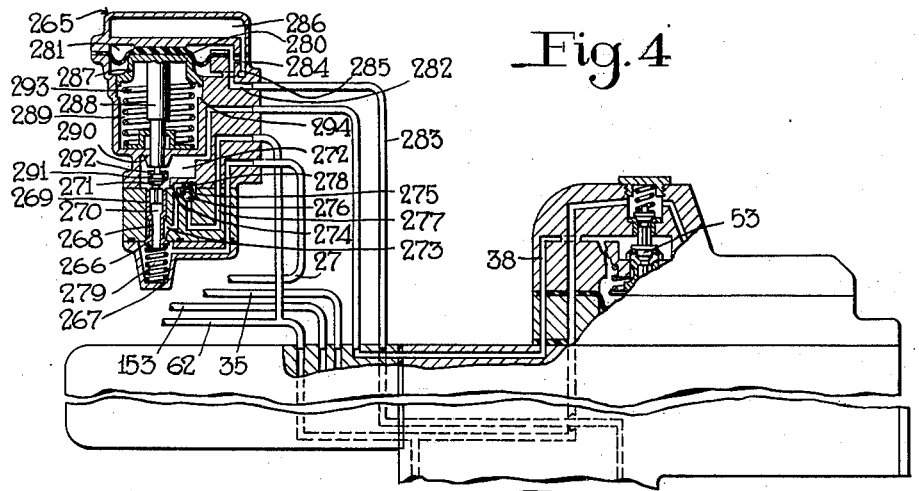

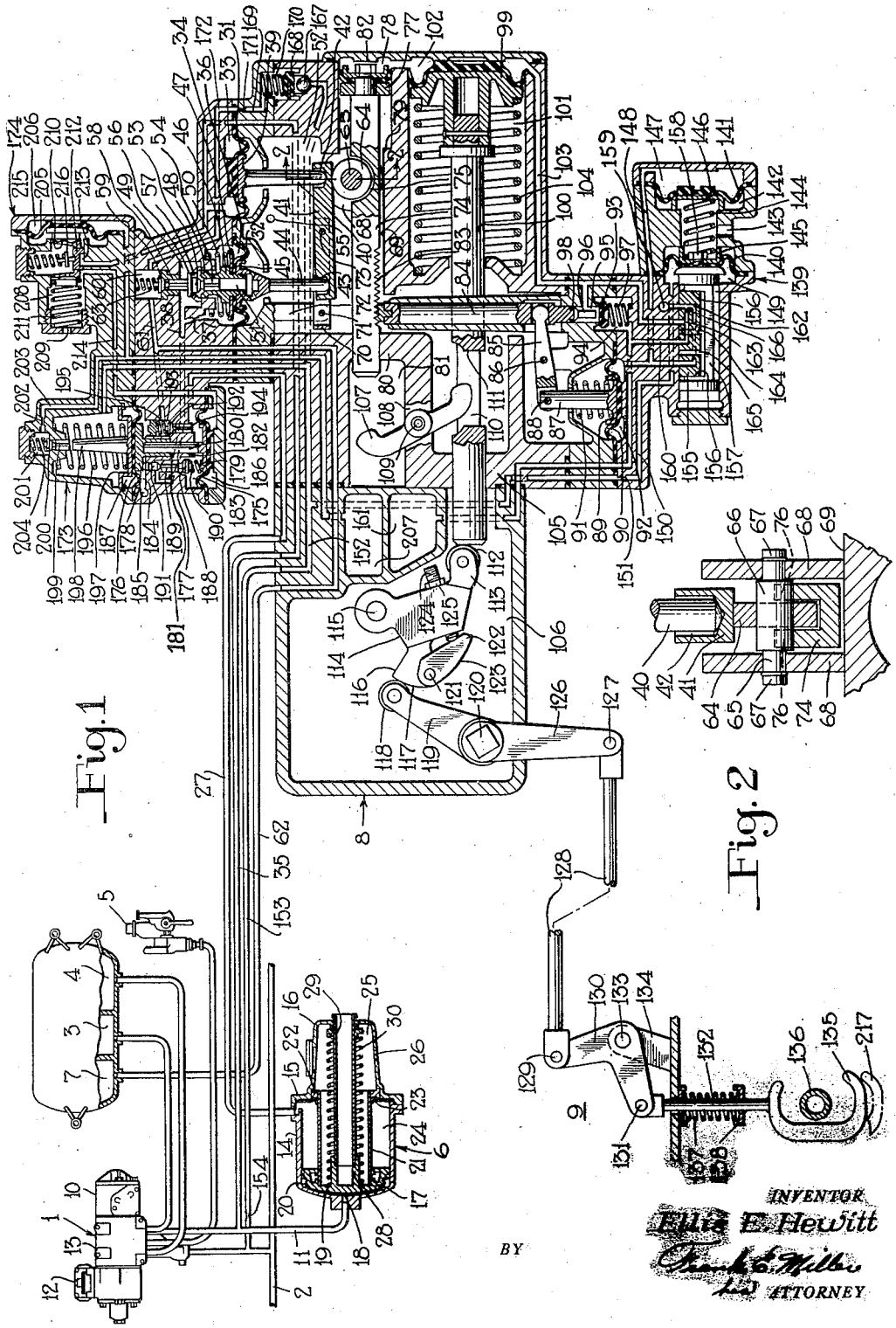

Aug. 24, 1948.                E. E. HEWITT                2,447,857
              LOAD COMPENSATING FLUID PRESSURE BRAKE EQUIPMENT
Filed May 21, 1947                                2 Sheets-Sheet 2

INVENTOR
Ellis E. Hewitt
BY Frank E. Miller
his ATTORNEY

Patented Aug. 24, 1948

2,447,857

UNITED STATES PATENT OFFICE 2,447,857

LOAD COMPENSATING FLUID PRESSURE BRAKE EQUIPMENT

Ellis E. Hewitt, Edgewood, Pa., assignor to The Westinghouse Air Brake Company, Wilmerding, Pa., a corporation of Pennsylvania Application May 21, 1947, Serial No. 749,572

18 Claims. (Cl. 303—22)

This invention relates to fluid pressure brake equipment and more particularly to the type for varying the degree of braking of a vehicle or car in accordance with the weight of the car which varies according to the empty or loaded condition thereof.

The present trend toward the use of light weight materials in the construction of railway cars has resulted in much higher ratios of gross to tare weight than ever before encountered, and the well known, standard "AB" brake equipment for freight cars employing the usual type of brake cylinder device, disclosed in C. C. Farmer Patent No. 2,031,213, issued February 18, 1936, will not provide the desired degree of braking of these cars when empty as well as when loaded. If, for example, the brake cylinder device is proportioned to provide the desired degree of braking of the car when empty, it is wholly inadequate for braking the car when fully loaded, and, conversely, if it is proportioned to adequately brake the fully loaded car, it will provide excessive braking of the empty car which might result in damaging shocks in a train and undesired sliding of the car wheels.

In order to properly brake the new light weight freight cars, a load compensating brake equipment, disclosed in the copending application of Earle S. Cook et al., Serial No. 736,010, filed March 20, 1947, assigned to the assignee of the present application, and embodying the "AB" brake controlling valve device of the "AB" brake equipment above mentioned, has been provided which is automatically operative to vary the degree of braking of the car in substantial proportion to its weight whether empty or partially or fully loaded.

The "AB" valve embodies means for so regulating an emergency application of brakes on a car as to cause stopping of a train of cars equipped with the "AB" equipment in the shortest possible time without creating damaging shocks due to the run in or gathering of train slack, incident to the serial application of brakes. This regulating means consists of structure which in response to an emergency reduction in brake pipe pressure, provides an initial inshot of fluid under pressure to the brake cylinder device to create a slight serial retardation of the cars in the train to cause the train slack to start to gently gather toward the front end of the train. This inshot of fluid under pressure is then followed by a gradual, continuous supply of fluid under pressure to the brake cylinder device at such a relatively slow rate and of such duration as to permit the slack in the train to sufficiently gather to prevent harsh slack action, following which, the rate of supply of fluid under pressure to the brake cylinder device is increased to a relatively rapid rate to quickly obtain the required braking force to promptly bring the train to a stop.

The above mentioned load compensating brake equipment provides a higher degree of braking on a loaded car than obtained with the "AB" equipment, due to which, there is a possibility that, in effecting an emergency application of the brakes, the supply of fluid under pressure to the brake cylinder device provided by the "AB" valve will cause a development of braking force on cars of a train sufficiently faster than obtained with the "AB" equipment as to accelerate the gathering of slack to a degree which will result in damaging shocks, and the principal object of the invention is therefore the provision of a load compensating brake equipment emodying means, separate from the "AB" valve forming a part of the equipment, for insuring that damaging shocks will not develop in a train upon effecting an emergency application of brakes.

The load compensating brake equipment disclosed in the above mentioned Cook et al. application comprises, in addition to the "AB" valve, a so-called compensating brake cylinder device and a load compensating device. The compensating brake cylinder device has two pressure chambers, one in front of the brake cylinder piston, corresponding to the usual brake cylinder pressure chamber, and to which fluid under pressure is adapted to be suppplied by the "AB" valve upon a reduction of brake pipe pressure for actuating said piston to apply the brakes on the car. At the opposite side of the brake cylinder piston is a compensating chamber in which, by operation of the load compensating device, the pressure of fluid is adapted to be varied, from atmospheric pressure for a fully loaded car, substantially inversely in proportion to the degree of car load to a certain maximum pressure for the car when empty. The pressure in the compensating chamber opposes that in the usual pressure chamber to limit the effect of the latter pressure to apply the brakes, and as a consequence, to vary the degree of braking of the car in substantial proportion to the car weight as governed by the degree of load carried by the car or whether the car is empty.

According to the invention there is associated with the load compensating device, delay means operative upon initiating an emergency application of brakes to render the load compensating device ineffective to control the pressure of fluid in the brake cylinder compensating chamber and to suply fluid to said chamber at a rate and to a pressure to limit the increase in braking force on the car to a sufficiently slower rate and limited degree than obtained in the variable load equipment disclosed in the above mentioned copending Cook et al. application, as to positively insure a gentle gathering of the train slack. At the termination of a period of time required for the gathering of train slack the delay means automatically restores the control of pressure to the brake cylinder compensating chamber to the load compensating device which then operates to promptly adjust the pressure in the brake cylinder compensating chamber to the value corresponding to the weight of the car for promptly bringing the car to a stop.

Other objects and advantages will become apparent from the following more detailed description of the invention.

Figure 3:
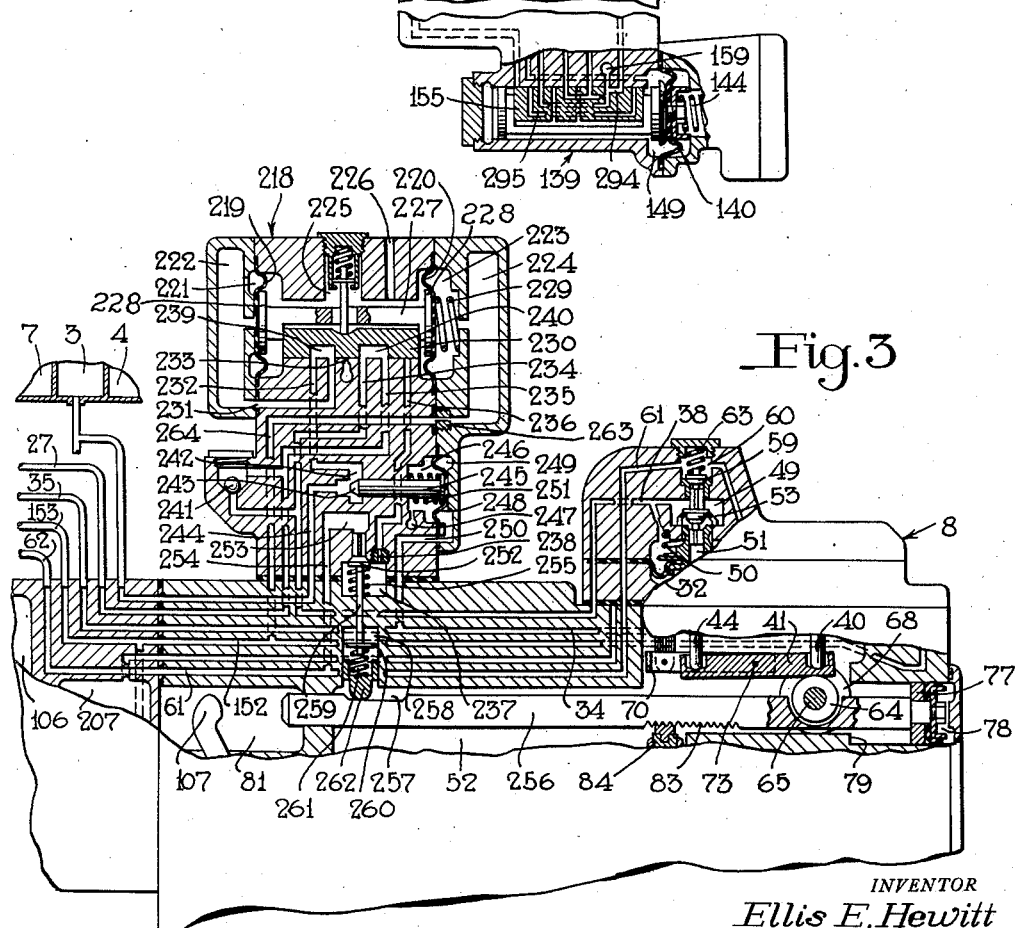

In the accompanying drawings; Fig. 1 is a diagrammatic view, mainly in section, of a load compensating brake equipment embodying one form of the invention; Fig. 2 is a sectional view taken on the line 2—2 in Fig. 1; and Figs. 3 and 4 are views similar to a portion of Fig. 1 but embodying other forms of the invention.

Description—Fig. 1

The load compensating brake equipment shown in Fig. 1 of the drawing may be the same as that disclosed in the aforementioned Cook et al. copending application, except for parts embodying the invention which will be specifically pointed out hereinafter, and comprises a brake controlling valve device 1 to which is connected the usual brake pipe 2, auxiliary reservoir 3, emergency reservoir 4 and brake cylinder pressure retaining valve device 5, as well as a brake cylinder device 6. The equipment further comprises a load reservoir 7, a load compensating or variable leverage relay valve device 8 and a weighing gear or adjusting mechanism 9 associated with such compensating device. The auxiliary, emergency and load reservoirs are preferably provided in a common casing separated by dividing walls as shown in the drawing. All of the above enumerated structures are adapted to be carried by a sprung part of a car, such as by the floor thereof.

The brake controlling valve device 1 may be of substantially the same construction and have the same operating characteristics as the "AB" valve fully described in the Farmer patent above mentioned, in view of which it is not deemed necessary to show and describe this device in detail. Briefly, however, the brake controlling valve device 1 comprises a service portion 10 adapted to operate upon both a service and an emergency reduction in pressure of fluid in the brake pipe 2 for supplying fluid under pressure from the auxiliary reservoir 3 to a brake cylinder pipe 11 and thence to the brake cylinder device 6 for, upon a service reduction in brake pipe pressure, effecting a service application of brakes on the car. The brake controlling valve device 1 also comprises an emergency portion 12 which is adapted to operate only upon an emergency reduction in pressure of fluid in brake pipe 2 for supplying fluid under pressure from the emergency reservoir 4 to pipe 11 and thence to brake cylinder device 6, wherein such pressure, in addition to that provided from the auxiliary reservoir 3 by operation of the service portion 10, is adapted to operate the brake cylinder device 6 for effecting an emergency application of brakes on the car. The service and emergency portions 10 and 12 of the brake controlling valve device 1 are mounted on opposite faces of a pipe bracket 13 to which all pipe connections to said valve device are made, as shown in the drawing.

The brake cylinder device 6 comprises a hollow cup-shaped casing 14 to the open end of which is secured an annular pressure head 15 from which projects a hollow cup-shaped non-pressure head 16. A brake cylinder piston 17 is slidably mounted in the casing 14 and at one side thereof is the usual or a main pressure chamber 18 to which is connected the brake cylinder pipe 11.

The brake cylinder piston 17 comprises a piston head 19 to one face of which is connected a flexible packing cup 20 for preventing leakage of fluid under pressure from pressure chamber 18 to the opposite side of the piston. Secured at one end to and projecting from the piston 17 in a direction away from the pressure chamber 18 is a hollow stem 21 the opposite end of which is slidably mounted in a ring 22 secured in the pressure head 15. Carried by the pressure head 15 and ring 22 is a packing cup or sealing ring 23 having sealing and sliding contact with the outer peripheral surface of the stem 21 for preventing leakage of fluid under pressure from a compensating pressure chamber 24 formed around said stem between the pressure head 15 and the piston 17, to a non-pressure chamber 25 formed within said stem and open to the interior of the non-pressure head 16 and thence to atmosphere through a port 26 in said non-pressure head. The pressure chamber 24 is open to a pipe 27 through which fluid under pressure is adapted to be supplied to and released from said chamber by operation of the compensating valve device 8, in a manner which will be hereinafter described.

The brake cylinder piston head 19 is provided with a hollow boss 28 projecting into the hollow stem 21 in coaxial relation to said head and stem, and one end of a hollow rod 29 is secured in said boss. The rod 29 extends through the non-pressure chamber 25 and a bore provided in the outer end of the non-pressure head 16 to the exterior thereof, said rod being hollow to accommodate the usual push rod (not shown) for connecting the piston head 17 to the brake rigging (not shown) of the car, in the conventional manner. Encircling the hollow rod 29 is a brake cylinder piston release spring 30 one end of which bears against the piston head 19 for moving the brake cylinder piston to its brake release position, in which it is shown in the drawing. The opposite end of the release spring 30 is supported on the non-pressure head 16.

The load compensating device 8 comprises a casing containing pilot and balancing flexible diaphragms 31 and 32, respectively, preferably of the same area, arranged edge to edge in spaced apart relation with their axes parallel and clamped around their edges in the casing. At one side of the pilot diaphragm 31 is a pressure chamber 33 which is connected to the brake cylinder pipe 11 through a passage 34 and a pipe 35. At the same side of diaphragm 32 is a balancing chamber 36 adapted to be normally connected to pipe 27 leading to pressure chamber 24 in the brake cylinder device by way of a restricted passage 37 and a passage 38. Engaging the opposite face of diaphragm 31 is a follower 39 provided on one end of a stem 40 the opposite end of which engages an equalizing member or beam 41 within a pocket 42. Engaging the opposite end of beam 41 within a similar pocket 43 is one end of a stem 44. The opposite end of stem 44 is in the form of a follower 45 which is secured to the side of diaphragm 32 opposite chamber 36 by means of a nut 46 contained in said chamber and between which nut and diaphragm is interposed a spring seat 47.

The nut 46 has an extension 48 slidably mounted in a bore in the casing and separating chamber 36 from a chamber 49 which is in communication with passage 38. A precompressed spring 50 contained in chamber 36 has one end supported by the casing while its opposite end bears against the spring seat 47. The nut 46 and extension 48 thereof are provided with an axial bore 51 open at one end to a chamber 52 in the casing and provided around the opposite end with a valve seat arranged for engagement by a release valve 53 which is contained in chamber 49 and which has a fluted stem 54 slidably mounted in said bore. Chamber 52 is in constant communication with the atmosphere as through a passage 55. It will be noted that the diaphragm stems 40, 44, and beam 41 are contained in chamber 52 and that the lower faces of the two diaphragms 31 and 32 are both subject to atmospheric pressure in said chamber.

The release valve 53, opposite the fluted stem 54, has an enlarged annular collar 56 one side of which is provided for contact with a combined valve guide and stop element 57 projecting from the casing into chamber 49, while the opposite side is arranged for contact by the end of a fluted stem 58 of a coaxially arranged fluid pressure supply valve 59 which is contained in a chamber 60. The chamber 60 is open to a passage 61 leading to a pipe 62 which is connected to the load reservoir 7. A bias spring 63 contained in chamber 60 bears on the supply valve 59 for urging it toward its seat.

The side of the equalizing member or beam 41 opposite that from which the diaphragm follower stems 40 and 44 project is supported on a fulcrum, preferably in the form of a roller 64, which is carried by an axle 65 on an enlarged central portion 66 thereof (Fig. 2). The axle 65 has reduced end portions 67 at opposite ends of the central portion 66 and mounted on these end portions are rollers 68, one disposed at either side of beam 41 and arranged to roll on a flat surface 69 in the casing. The surface 69 is formed at right angles to the normal, substantially parallel axes of the diaphragms 31 and 32.

The equalizing member or beam 41 is held against longitudinal movement by a yoke 70 pivoted at one end on a pin 71 carried in an arm 72 projecting from the casing. The two arms 72 of the yoke 70 are disposed at opposites of the beam 41 between the rollers 68 and their ends are pivotally connected to said beam near its center by a pin 73. The roller 64 is adapted to be adjusted relative to the beam 41 longitudinally thereof to provide at its line of contact with the beam a fulcrum therefor, the yoke 70 being effective during such adjustment, and at all other times, to prevent longitudinal movement of said beam but in no way interfering with rocking movement of said beam upon its fulcrum connection with the roller 64, which will be later described.

Disposed between the equalizing member or beam 41 and the surface 69 and extending lengthwise of and substantially parallel to said surface is a piston rod 74. The rod 74 has a substantially semi-circular recess 75 of larger radius than roller 64 for receiving said roller, and at either side of said recess said rod is provided with a transverse slot 76 (Fig. 2) open to the top edge of said rod and in these slots the enlarged central portion 66 of axle 65, at either side of the roller 64, is slidably mounted, the rollers 68 being disposed at opposite sides of the piston rod 74.

Connected to one end of the piston rod 74 is a bias piston 77 open at one side to a control or pressure chamber 78, while the opposite side of said piston is open to the atmospheric chamber 52. A shoulder 79 in the casing is arranged for contact by piston 77 for limiting movement thereof in the direction of the left-hand; movement in the direction of the right-hand being limited by contact with the casing. The piston rod 74 projects from the piston 77 and through the chamber 52 and a bore in a wall 80 separating said chamber from a chamber 81 in the casing, the end of said rod opposite said piston being supported by contact with the wall of said bore.

The fulcrum roller 64 has two extreme positions with respect to the equalizing member or beam 41, one position being that in which it is shown in the drawing in which the roller 64 is disposed substantially below the end of the diaphragm follower stem 40 and the piston 77 is slightly spaced from the right hand end wall 82 of chamber 78. This position will be assumed when the car is fully loaded and will hereinafter be referred to as the full load position. The other extreme position, to be hereinafter referred to as empty position, and which roller 64 will occupy when the car is empty, is adapted to be defined by contact between piston 77 and shoulder 79. For various degrees of car load between empty and full load the roller 64 will assume a corresponding position between the empty and full load positions, just mentioned. Automatic adjustment of fulcrum roller 64 to its different positions will hereinafter be described.

The piston rod 74 is provided in chamber 52 with a plurality of teeth 83 along the side opposite the beam 41 for engagement by teeth on one end of a latch or locking plunger 84 which is mounted to slide in the casing in a direction at right angles to the length of said rod. A lever 85 fulcrumed on a pin 86 carried by a projection of the casing has one end connected to the plunger 84. The opposite end of lever 85 is connected to one end of a rod 87 by a pin 88, the opposite end of which rod is in the form of a follower 89 which engages one side of a latch or plunger control flexible diaphragm 90 clamped around its periphery in the casing. A spring 91 encircling the rod 87 and supported at one end on the casing bears against the diaphragm 90 for urging it and plunger 84 to the position in which they are shown in the drawing, in which position said plunger is in locking engagement with the piston rod 74. At the opposite side of diaphragm 91 is a pressure chamber 92 to which fluid under pressure is adapted to be supplied for deflecting said diaphragm against spring 91 for thereby actuating lever 85 to draw plunger 84 out of locking engagement with piston rod 74.

A check valve 93 contained in a chamber 94 is provided for closing communication between said chamber and a chamber 95 into which extends a projection 96 of the plunger 84. With plunger 84 in locking engagement with piston 74, the end of projection 96 is spaced from check valve 93 a distance slightly exceeding the extent of movement of said plunger required to release said plunger from said rod. Upon further movement, the projection 96 is adapted to engage and unseat valve 93. A spring 97 contained in chamber 94 acts on check valve 93 for urging it to its seat. A ring seal 98 on plunger 84 prevents leakage of fluid under pressure from chamber 95 to chamber 52.

Spaced from and extending generally parallel to the bias piston 77 and its rod 74 is an adjusting piston 99 and a rod 100 projecting from one side of said piston through a non-pressure chamber 101 which is open to chamber 52. At the opposite side of piston 99 is a pressure chamber 102 open to the bias piston chamber 78 and to a passage 103 which passage also connects to chamber 95. A spring 104 contained in the non-pressure chamber 101 and encircling the rod 100 is supported at one end on the casing, while its opposite end bears against piston 99 for urging said piston and rod to the position in which they are shown in the drawing. The end of rod 100 opposite the piston 99 is supported in a bore in the wall 105 separating chamber 52 from a chamber 106.

A lever 107 extending through an opening 108 in a horizontal portion of the casing wall 80 is fulcrumed therein on a pin 109. The end of this lever in chamber 81 is arranged for contact with the end of the bias piston rod 74, while the opposite end of said lever is disposed in a slot 110 provided in the adjusting piston rod 100. The slot 110 is of such length as to permit the lever 107 to be free on pin 109 with the adjusting piston 99 in the normal position in which it is shown in the drawing, and to permit a chosen extent of movement of said piston against spring 104 before an end wall 111 of said slot engages said lever.

In chamber 106 the end of the adjusting piston rod 100 engages a roller 112 provided in the end of an arm 113 of a bell-crank like lever 114 which, at its knee, is fulcrumed on a pin 115 secured in the casing. The lever 114 has another arm 116 on the end of which is provided a fixed cam surface 117 arranged for contact by a roller 118 provided in one end of a lever 119 the opposite end of which is secured to turn with a shaft 120 journaled in the casing. The cam surface 117 is of least radius at the end adjacent the roller 118, as viewed in the drawing. Secured by a pin 121 to the bell-crank arm 116, adjacent the opposite end of cam surface 117, is an adjustable cam element 122 having a cam surface 123 constituting an extension of the fixed cam surface 117. The cam element 122 is supported on one end of an adjusting screw 124 carried by the lever arm 113. A lock nut 125 on screw 124 is provided for contact with the lever arm 113 for securing said screw in an adjusted position.

A lever 126 disposed outside of the casing (in practice) has one end secured to turn with the shaft 120, and connected to the opposite end by a pin 127 is one end of a connecting rod 128. The other end of rod 128 is connected by a pin 129 to the end of one arm of a bell crank 130 the end of the other arm of which is connected by a pin 131 to a rod 132. The bell crank 130 is pivoted at its knee on a pin 133 carried by a sprung part 134 of the car, and the rod 132 depends from the bell crank through an opening in said sprung part. To the lower end of rod 132 is secured a substantially C shaped measuring element 135 within which is disposed an unsprung part 136 of a car truck. The part 136 may be in the form of a rod extending transversely of the car truck or if desired may constitute an axle of a truck wheel and axle assembly. A compressed coil spring 137 encircling the rod 132 and having one end supported by the sprung truck part bears against a follower 138 on said rod for urging the element 135 to the position in which it is shown in the drawing, out of contact with the unsprung truck part 136.

The load compensating device 8 further comprises a cut-out valve device 139. The cut-out valve device 139 comprises two coaxially arranged, flexible diaphragms 140 and 141 clamped around their edges in the casing and spaced apart in their relation to each other. Between the two diaphragms is a chamber 142 which is open to atmosphere through a vent port 143 and which contains a spring 144 the opposite ends of which bear against followers 145 and 146 engaging diaphragms 140 and 141, respectively, for urging said diaphragms apart. At the outer face of diaphragm 141, which is larger than diaphragm 140, is a pressure chamber 147 which is connected to a passage 148 also connected to the latch diaphragm chamber 92. At the opposite face of diaphragm 140 is a valve chamber 149 which is in constant communication with brake pipe 2 through a passage 150, a choke 151, a passage 152 and thence by way of a pipe 153 in which there is provided a choke 154. In actual practice the pipe 153 is connected directly to pipe bracket 13 of the "AB" valve 1 and through said pipe bracket to the well-known brake pipe connection (not shown) therein, and the choke 154 is disposed in said bracket, but for the purpose of simplicity in the present application, the pipe 154 is shown in the drawing connected directly to the brake pipe 2, as above described.

The cut-out valve device 139 further comprises a slide valve 155 contained in chamber 149 between two spaced shoulders 156 formed on a stem 157. One end of the stem 157 is connected by follower 145 and a cap screw 158 to the center of diaphragm 140 for rendering the slide valve 155 movable by and with said diaphragm.

Connected to the seat of the cut-out slide valve 155 is an atmospheric passage 159, the passage 103 from the bias and adjusting piston chambers 78 and 102, a passage 160 which leads to the check valve chamber 94 and to a timing reservoir 161, and passage 148 leading to the latch diaphragm chamber 92 and to diaphragm chamber 147. The slide valve 155 is provided with ports 162, 163, 164, and 165 and a choke connection 166, for a purpose to be hereinafter described.

The load compensating device 8 further comprises two check valves 167 and 168 arranged in series in a communication between the brake pipe passage 152 and a passage 169. A bias spring 170 acts on the check valve 168 for urging it to its seat. The passage 169 is connected through a choke 171 to a passage 172 leading to the supply valve chamber 60 and thence through passage 61 and pipe 62 to the load reservoir 7.

According to the invention I associated with the load compensating device 8, a delay valve device 173 and a timing valve device 174.

The delay valve device 173 comprises two spaced apart coaxially arranged flexible diaphragms 175 and 176 which are clamped around their edges in the casing. The two diaphragms are separated by a partition wall 177 and are operatively connected to each other by followers 178 and 179 engaging, respectively, the adjacent faces of said diaphragms and provided with telescoping stems 180 and 181 slidably mounted in coaxially arranged bores through said partition wall. A sealing ring 182 in the partition wall 177 is provided for contact with stem 180 for preventing leakage of fluid under pressure along the stems 180 and 181 from a chamber 183 formed at one side of diaphragm 175 to a chamber 184 formed at the adjacent side of diaphragm 174. The chamber 184 is open to atmosphere through a vent port 185, while chamber 183 is open to pipe 27 leading to the brake cylinder compensating pressure chamber 24. At the opposite and outer side of diaphragm 175 is a pressure chamber 186 connected to a passage 214 leading to the timing valve device 174, while at the opposite side of diaphragm 176 is a chamber 187 which is connected to passage 152 and thereby to the brake pipe 2.

A poppet valve 188 contained in chamber 183 at one side of the follower 179 has a fluted stem 189 arranged to slide in a bore extending through partition wall 177 to chamber 185 at one side of and parallel to the diaphram follower stems 180, 181, for controlling communication between passage 38, which is open to said bore, and said chamber. A spring 190 disposed in chamber 183 and supported at one end on the diaphragm follower 179 bears against the valve 188 for seating it. The valve stem 189 engages in the bore in partition wall 177 one end of a plunger 191 slidably mounted in said bore and extending through chamber 184 for engagement by the diaphragm follower 178. Deflection of diaphragm 176 in the direction of valve 188 is adapted to operate plunger 191 to unseat said valve. At the opposite side of diaphragm follower stem 180 is another poppet valve 192 contained in a chamber 193 connected to passage 61 and having a fluted stem 194 extending parallel to said diaphragm follower stem through a suitable bore in the partition wall 177 into chamber 183 for contact by the diaphragm follower 179 for unseating said valve. A spring 195 in chamber 193 acts on the valve 192 for urging it to its closed position with the diaphragm 175 in the position in which it is shown in the drawing.

A spring 196 contained in chamber 187 and having one end supported by the casing bears at its opposite end against a spring follower 197 provided for engagement with the adjacent face of diaphragm 176. Projecting from the spring follower 197 is an operating stem 198 arranged for contact with a fluted stem 199 of a check valve 200 for unseating said check valve upon movement of diaphragms 175 and 176 in the direction of said valve and for permitting closure of said check valve when in the position in which they are shown in the drawing. The check valve 200 is contained in a chamber 201 which is connected through a choke 202 and a passage 203 to the timing valve device 174. A light valve spring 204 contained in chamber 201 acts on the check valve 200 for urging it to its closed position.

The timing valve device 174 comprises a flexible diaphragm 205 at one side of which is a chamber 206 to which is connected the passage 203, the passage 203 also leading to a timing volume 207 in the load compensating valve device 8, this volume constituting a part of the present invention although it was also disclosed in the above referred to copending Cook et al. application wherein it performed no useful functions. At the opposite side of diaphragm 205 is a chamber 208 which is open to atmosphere through a vent port 209. An operating stem 210 disposed in chamber 208 has one end in contact with the adjacent face of diaphragm 205 while acting against the opposite end of said stem is a precompressed spring 211. A slide valve 212 mounted to slide on a seat in chamber 208 is disposed in a recess in stem 210 for movement thereby. The slide valve 212 has a cavity 213 for, in one position of said valve, connecting passage 34 to a passage 214 leading to diaphragm chamber 186 in the delay valve device 173. In another position the slide valve 212 closes communication between passages 34 and 214 and the latter passage is opened to chamber 208 and thence to atmosphere. A spring 215 contained in chamber 208 acts through a pusher pin 216 on the slide valve 212 for holding it seated against pressure of fluid effective in cavity 213.

*Operation—Fig. 1*

In operation, let it be initially assumed that the brake equipment is devoid of fluid under pressure and that to condition said equipment for operation fluid under pressure is supplied to the brake pipe 2 in the usual manner.

The brake controlling valve device 1 will respond, in the usual manner, to the pressure of fluid thus supplied to the brake pipe 2 to charge the auxiliary reservoir 3 and the emergency reservoir 4 with fluid under pressure from the brake pipe, and to at the same time open to atmosphere, if not already opened, the brake cylinder pipe 11 and thereby pressure chamber 18 in the brake cylinder device 6. With pipe 11 thus open to atmosphere the pilot diaphragm chamber 33 in the load compensating device 8 will also be open to atmosphere by way of passage 34 and pipes 35 and 11, which will permit spring 50 to deflect the balancing diaphragm 32 against the stem 44 and rock the balancing beam 41 about its fulcrum connection with roller 64, regardless of the adjusted position of said roller, to deflect the pilot diaphragm 31 into contact with the casing, in which position these parts are shown in the drawing.

With the balancing diaphragm 32 positioned as just described spring 63 will seat the fluid pressure supply valve 59 and the collar 56 on the release valve 53 will be just out of contact with the supply valve stem 58 and in engagement with the stop element 57 which will hold said valve out of contact with its seat on the nut extension 48. With the release valve 53 thus open, chamber 49 and passage 38, and thereby chamber 36, will be open to atmosphere by way of bore 51 in the nut 46, chamber 52 and atmospheric port 55.

With the parts of the timing valve device 174 in the position in which they are shown in the drawing, diaphragm chamber 186 in the delay valve device 173 will be open to atmosphere through passage 214 and chamber 208 in said timing valve device, so that spring 196 in the delay valve device will deflect the diaphragms 176 and 175 to the position in which they are shown on the drawing to permit closure of valve 192 by spring 195 and opening of valve 188 by plunger 191. With valve 188 open, diaphragm chamber 183 and thereby the connected brake cylinder compensating chamber 24 will be open to passage 38 and thus to atmosphere past the unseated release valve 53. With pressure chambers 18 and 24 in the brake cylinder device 6 both open to atmosphere the brake cylinder piston 17 will assume its brake release position, in which it is shown in the drawing, under the action of the release spring 30.

When fluid under pressure is supplied to the brake pipe 2 for charging the equipment as above mentioned, fluid will also flow from the brake pipe through choke 154 and pipe 153 to the load compensating device 8 and thence through passage 152, past the check valves 167 and 168 through choke 171, passage 172, supply valve chamber 60, passage 61 and pipe 62 to the load reservoir 7 for charging said reservoir with fluid at substantially the pressure in the brake pipe. Fluid thus supplied to passage 61 will also flow to the poppet valve chamber 193 in the delay valve device 173, but the poppet valve 192 in said chamber will at this time be closed under the action of spring 195.

Fluid under pressure supplied from the brake pipe to passage 152 in the load compensating device 8 will also flow therefrom into chamber 187 of the delay valve device 173 and therein act to unseat the check valve 200 against the relatively light force of spring 204 whereupon fluid from the brake pipe will flow past said check valve to chamber 201 and thence through choke 202 and passage 203 to diaphragm chamber 206 in the timing valve device 174 and also to the timing volume 207 for charging said chamber and volume with fluid at substantially the pressure in the brake pipe.

At the same time, fluid supplied from the brake pipe to the load compensating device 8 will also flow from passage 152 through the choke 151 and passage 150 into valve chamber 149 of the cut-out valve device 139.

The parts of the cut-out valve device 139 have a cut-in position which they occupy when the equipment is devoid of fluid under pressure and during initial charging of the equipment until the brake pipe pressure is increased to a certain chosen pressure, such as 40 pounds, whereupon said parts move to a cut-out position in which they are shown in the drawing. The parts then remain in the cut-out position until the brake pipe pressure is subsequently reduced, as upon an emergency reduction in brake pipe pressure, to a degree such as 8 pounds, at which time they return to their cut-in position, all of which will be hereinafter described.

In the cut-in position of the cut-out valve device 139 the spring 144 deflects the diaphragm 141 into contact with the right hand end wall of chamber 147 and deflects the diaphragm 140 and moves slide valve 155 to a position in which ports 164 and 165 in said valve register with passages 148 and 160, respectively, so that fluid under pressure supplied to chamber 149 from the brake pipe will flow therefrom through port 164 to passage 148 and thence to check valve chamber 94 and timing chamber 161, and, at the same time, fluid will also flow from said valve chamber through port 165 to passage 148 and thence to the latch diaphragm chamber 92 and also to diaphragm chamber 147.

When the pressure of fluid thus supplied to the latch diaphragm chamber 92 is increased to a degree, such as 10 pound, which is sufficient to overcome the opposing force of spring 91, the diaphragm 90 will deflect against said spring and actuate lever 85 to draw the locking plunger 84 out of locking engagement with the bias piston rod 74, following which, the projection 96 of said plunger will engage and unseat check valve 93. Fluid under pressure supplied from the cut-out valve chamber 149 to the check valve chamber 94 will then flow to chamber 95 and thence through passage 103 to the adjusting piston chamber 102 and to the bias piston chamber 78. Fluid under pressure thus provided on the bias piston 77 will promptly move said piston in the direction of the left hand for thereby actuating the axle 65 to move the fulcrum roller 64 to its empty position substantially under the pin 73.

When the pressure of fluid in chamber 102 acting on the adjusting piston 99 is increased to a degree sufficient to overcome the opposing force of spring 104 said piston will move against said spring and thereby rock the bell-crank lever 114 in a clockwise direction about pin 115, and through the medium of cam surface 117 the levers 119 and 126 will be rocked in a counterclockwise direction and pull the connecting rod 132 in an upwardly direction. This movement of the connecting rod 132 will in turn draw the measuring element 135 into contact with the unsprung part 136 of the car truck, which will prevent further movement of piston 99 by pressure of fluid in chamber 102.

When the equipment is devoid of fluid under pressure, as well as after an adjusting operation such as being described, the measuring element 135 will occupy the position with respect to the unsprung part 136 of the car truck in which it is shown in the drawing when the car is empty, so that during adjustment movement of the piston 99 will be stopped by contact between said element and the unsprung part 136 when the surface 111 on the adjusting piston rod 100 just contacts the adjacent end of lever 107 with the other end of said lever just in contact with the adjacent end of the bias piston rod 74 and with the bias piston 77 and fulcrum roller 64 in empty position above described. Thus for an empty car the fulcrum roller 64 will be adjusted to its empty position in which it is shown on the drawing. Furthermore, with the car empty the roller 118 carried in the end of lever 119 will move just to the junction of the fixed cam surface 117 on the bell-crank lever 114 and the adjustable cam surface 123 on the adjustable element 122 when the measuring element 135 contacts the unsprung truck part 136.

If the car is fully loaded the body thereof will occupy a position closer to the unsprung part 136 of the truck than when the car is empty. In this fully loaded position the lower portion of the measuring element 135 may therefore initially occupy a position such as indicated by a dot and dash line 217 in the drawing and therefore require a greater movement before it comes into contact with the unsprung part 136, to thus permit a greater movement of the adjusting piston 99 by pressure of fluid in chamber 102 than when the car is empty. The adjustable cam 122 will therefore become effective to operate levers 119 and 126 during this greater movement and said cam will be so adjusted by regulating screw 124 as to permit sufficient movement of piston 99 to actuate lever 107 to move the bias piston rod 74 and piston 77 against pressure of fluid in chamber 78 to a position in which piston 77 is in substantial contact with the right hand end wall of chamber 78 and in which the roller 64 will therefore occupy its full-load position substantially under the end of the diaphragm follower stem 40.

For various degrees of load on the car between empty and full load, the car body will assume corresponding positions with respect to the unsprung part 136 of the car, and as a result, the measuring element 135 and the fulcrum roller 64, as actuated by the adjusting piston 99, will likewise assume corresponding positions between the empty and full load positions thereof, as will be clear from the above description.

The cam 122 is adjustable in accordance with the amount of deflection of the car body supporting springs (not shown) between the empty and full loaded conditions thereof in order to obtain the desired positioning of roller 64 for the empty and full loaded conditions of the car, regardless of variations in the deflection characteristics of said springs such as encountered on different cars, as fully described in the Cook et al. application hereintofore referred to.

While the fulcrum roller 64 of the load compensating device 8 is being adjusted to a position corresponding to the empty or loaded condition of the car as just described, the pressure of fluid in diaphragm chamber 147 of the cut-out valve device 139 will continue to increase with the increase in pressure in the cut-out valve chamber 149 and in the brake pipe 2. This increase in pressure in diaphragm chamber 147 will act to gradually deflect diaphragm 141 toward the left hand to correspondingly increase the pressure of spring 144 against diaphragm 140 so as to offset the increase of pressure of fluid in chamber 149 on diaphragm 140 and thus hold the latter diaphragm and slide valve 155 against movement out of the cut-in position. Eventually, however, the pressure of fluid in diaphragm chamber 147 will become increased to a degree at which deflection of diaphragm 143 will be stopped by contact of the diaphragm follower 146 with the casing, as shown in the drawing, thereby limiting to a certain selected degree the increase in pressure of spring 144 against diaphragm 140. Then when the pressure of fluid in the brake pipe 2 and in valve chamber 149 becomes increased to a certain higher degree, such as 40 pounds, which is sufficient to overcome the opposing increased pressure of spring 144, the diaphragm 140 will be deflected toward the right hand to a position defined by contact between the diaphragm follower 145 and the casing, as shown in the drawing, for thereby shifting the slide valve 155 to its cut-out position.

In the cut-out position of the cut-out slide valve 155 the port 162 therein connects passage 148 to the atmospheric passage 159 whereupon fluid under pressure is vented from the latch diaphragm chamber 92 and from diaphragm chamber 147. The venting of fluid under pressure from the latter chamber permits the diaphragm 141 to be returned to the position defined by contact with the right hand end wall of chamber 147 by spring 142, which reduces the force of said spring on the diaphragm 140 to a degree which will prevent return of the latter diaphragm and of the slide valve 155 to their cut-in position until the brake pipe pressure effective in valve chamber 149 is subsequently reduced to a relatively low degree, such as 8 pounds, thereby insuring that the cut-out slide valve 155 will remain in its cut-out position, so as to maintain the fulcrum roller 64 in its adjusted position, during all normal operation of the brakes on the car while connected in a train.

The venting of fluid under pressure from the latch diaphragm chamber 92 upon movement of the cut-out valve 155 to its cut-out position permits spring 91 to return diaphragm 90 and lever 85 to the position in which they are shown on the drawing. This operation of lever 85 actuates plunger 84 out of engagement with the check valve 93 and into locking engagement of the bias piston rod 74. The check valve 93 will then be seated by spring 97.

At the same time as fluid under pressure is released from the latch diaphragm chamber 92 and from diaphragm chamber 147, passage 163 in slide valve 155 connects passages 160 and 103 to the atmospheric passage 159 by way of the choke connection 166. The timing reservoir 161, previously charged with fluid under pressure from the brake pipe, is thus placed in communication with the adjusting piston chamber 102 and bias piston chamber 78, and said reservoir and these chambers are all opened to atmosphere through the restricted connection 166, whereby the pressure of fluid in said reservoir and chambers will be gradually reduced at a rate determined by the flow capacity of said connection.

The volume of the timing reservoir 161 with respect to the flow capacity of the choke connection 166 is such as to maintain sufficient pressure in chamber 78 on the bias piston 77 and in chamber 102 on the adjusting piston 99 to firmly hold the bias piston rod 74 against lever 107 and the measuring element 135 in contact with the unsprung part 136 of the truck until after the locking plunger 84 is moved into locking engagement with the bias piston rod 73, following which, the pressure of fluid in said reservoir and chambers will continue to reduce to atmospheric pressure. When the pressure of fluid in the adjusting piston chamber 102 is thus sufficiently reduced, spring 104 will return the adjusting piston 99 to the position in which it is shown on the drawing, but the bias piston 77, and thereby the fulcrum roller 64, will be maintained in the position to which they were adjusted by the locking action of plunger 84.

When the adjusting piston 99 is returned to the position in which it is shown on the drawing, bias spring 137 acting on the rod 132 will urge said rod downwardly for moving the measuring element 135 out of contact with the unsprung part 136 of the truck back to the position in which it is shown on the drawing, and during such movement the bell-crank 130, connecting rod 128 and thereby levers 126 and 119 will also be actuated by said spring to return the bell-crank lever 114 to the position in which it also is shown on the drawing. With the measuring element 135 moved downwardly and out of contact with the unsprung part 136 of the truck, contact therebetween will be avoided during operation of the car in a train around curves, over humps, etc., to prevent damage to these parts.

After the cut-out valve device 139 operates to cause locking of the fulcrum roller 64 in its adjusted position and disengagement of the measuring element 135 from the unsprung truck part 136, as just described, the pressure of fluid in brake pipe 2 will continue to be increased up to the normal pressure desired to be carried, and the load reservoir 7 will become charged by way of the check valves 167 and 168 to substantially the same degree of pressure, as will be apparent. Likewise, diaphragm chamber 206 in the timing valve device 174 and the timing volume 207 will become charged to substantially the same degree of pressure as in the brake pipe 2.

Now when the pressure of fluid in chamber 206 of the timing valve device 172 is thus increased sufficiently to overcome the opposing force of spring 211 the diaphragm 205 will deflect in the direction of the left hand against spring 211 to a position in which cavity 213 establishes communication between passages 34 and 214.

With the equipment fully charged with fluid under pressure and the fulcrum roller 64 adjusted to its full-load position as above described, if it is desired to effect an emergency application of brakes on the car the pressure of fluid in the brake pipe 2 will be suddenly vented to atmosphere in the usual manner. Since chamber 187 in the delay valve device 173 is open to the brake pipe 2 through the passage 152 and pipe 153, the pressure in said chamber will also promptly reduce to that of atmosphere by way of the brake pipe.

The service and emergency portions 10 and 12, respectively, of the brake controlling valve device 1 will respond to the emergency reduction in brake pipe pressure to connect the auxiliary and emergency reservoirs 3 and 4, respectively, to the brake cylinder pipe 11 and thence to the usual pressure chamber 18 in the brake cylinder device 6, whereupon, by operation of the brake controlling device 1, there will be the initial rapid increase in pressure in said chamber to a relatively low degree, such as 15 pounds, followed by the slow increase in pressure therein up to a preselected degree, such as 47 pounds, and then the rate of supply of fluid under pressure to said chamber will be increased to provide equalization therein of the pressure of fluid in said reservoirs, in the well-known manner.

Fluid under pressure thus supplied to the brake cylinder pipe 11 and thence to the usual pressure chamber 18 in the brake cylinder device 6 will also flow from said pipe and through pipe 35 and passage 34 to the pilot diaphragm chamber 33 in the load compensating device and also from said passage through cavity 213 in the timing valve device 174 to passage 214 and thence to diaphragm chamber 186 in the delay valve device 173. With the fulcrum roller 64 in its full load position, substantially directly beneath the end of the pilot diaphragm push rod 40, the pressure of fluid thus obtained in the pilot diaphragm chamber 33 will be ineffective to deflect the diaphragm 31 against the pressure of bias spring 50 on the balancing diaphragm 32, as a result of which, said diaphragms will remain in the position in which they are shown in the drawing, in which the release valve 53 is open and the supply valve 59 is closed.

In the delay valve device 173, chamber 187 is, at this time, at atmospheric pressure due to being open to the brake pipe as above described. When the pressure of fluid from the brake cylinder pipe 11 obtained in the diaphragm chamber 186 of the delay valve device 173 becomes increased to a chosen degree, such as 25 pounds, sufficient to overcome the opposing force of spring 196, it will deflect the diaphragms 175 and 176 in an upward direction and, through the medium of spring 199, close the valve 189 and open the valve 193. Upon the opening of valve 189, fluid under pressure will then flow from the load reservoir 7 through pipe 62 and passage 61 to diaphragm chamber 183 in the delay valve device 171 and thence through pipe 27 to the brake cylinder compensating chamber 24, wherein it will act on the brake cylinder piston 17 in opposition to pressure of fluid in chamber 18, to thereby limit the effectiveness of the pressure of fluid in the latter chamber to apply the brakes.

It will be noted that fluid under pressure is supplied to the brake cylinder compensating chamber 24 as soon as substantially 25 pounds pressure is obtained in pressure chamber 18, and due to these pressures opposing each other on opposite sides of diaphragm 175 in the delay value device 173, and the action of spring 196 on said diaphragm, the pressure of fluid in the compensating chamber 24 will increase in unison with that in the main pressure chamber 18, maintaining however a chosen differential (25 pounds) between such pressures which differential is equal to the force of spring 196 in the delay valve device 173. It is desired to point out, however, that as the pressure of fluid in the two brake cylinder chambers 18 and 24 increase in unison the effectiveness of the pressure of fluid in chamber 18 to apply the brakes on the car increases in proportion, but the brake application is limited to a degree which will positively prevent harsh gathering of slack in a train.

When the diaphragm 175 in the delay valve device 173 is operated to open the valve 192 the stem 198 is also operated to open the check valve 200 whereupon the pressure of fluid in diaphragm chamber 206 of the timing valve device 174 and in the connected timing chamber 207 is permitted to flow past said check valve to chamber 187 and thence to atmosphere by way of the vented brake pipe 2 at a rate determined by the flow capacity of the choke 202 in passage 203. The size of this choke with respect to the volume of the timing chamber 207 is such as to maintain sufficient pressure in diaphragm chamber 206 of the timing valve device 174 for holding the diaphragm 205 against spring 211 in the position in which these parts are shown in the drawing, for a period of time, such as 18 seconds, sufficient to insure a complete gathering of the slack in the train. At the termination of this period of time the pressure of fluid in diaphragm chamber 206 will be sufficiently reduced for spring 211 to deflect diaphragm 205 in the direction of the right hand to a position in contact with the casing, this movement shifting the slide valve 212 to a corresponding position for closing communication between passages 34 and 214 and for opening the latter passage to atmosphere by way of spring chamber 208.

When passage 214 is opened to atmosphere through the timing valve device 174 as just mentioned fluid under pressure is promptly vented from diaphragm chamber 186 in the delay valve device 173 whereupon the pressure of fluid in the brake cylinder compensating chamber 24, effective in diaphragm chamber 183, returns the parts of the delay valve device 173 to the position in which they are shown on the drawing. When this occurs the check valve 192 is closed by spring 195 to prevent further flow of fluid under pressure from the load reservoir 7 to the brake cylinder compensating chamber 24, and the check valve 188 is opened by plunger 191 to connect said chamber to the release valve chamber 49. With the fulcrum roller 64 in its full-load position the release valve 53 is open as above mentioned, so that when the brake cylinder compensating chamber 24 is connected to chamber 49 fluid under pressure will be released from said compensating chamber past said release valve to atmosphere, whereupon the pressure of fluid in the main pressure chamber 18 of the brake cylinder device becomes fully effective to apply the brake to the degree required for properly braking the fully loaded car.

The delay valve device 173 will operate, as above described, to supply fluid to the brake cylinder compensating chamber 24 to limit the effectiveness of the pressure of fluid provided in the main brake cylinder chamber 18 to apply the brakes, and thereby limit the degree of braking of the car, for any degree of car load between full-load and some chosen partial degree of load, such as one-half load, but will not operate for any lesser degree of load where such limiting of braking force is not considered necessary for gentle gathering of slack in the train, as will now be described.

Let it be assumed that the fulcrum roller 64 is positioned for a substantially half-loaded car, substantially midway between its empty and full-load positions, under which condition the leverage ratio through beam 41 between the pilot diaphragm 31 and balancing diaphragm 32 may be about one to three. Now in effecting an emergency application of brakes, when fluid under pressure is supplied to the main pressure chamber 18 of the brake cylinder device 6 and a corresponding pressure is obtained in the pilot diaphragm chamber 33 and in chamber 186 of the delay valve device 173 by way of the timing valve device 174, the pilot diaphragm 31 will be deflected, before sufficient pressure is obtained in chamber 186 to overcome the opposing pressure of spring 196, to actuate beam 41 to seat the release valve 58 and to open the supply valve 59, whereupon fluid under pressure from the load reservoir 7 will flow through pipe 62 past said supply valve to chamber 49 and thence past the open valve 188 to diaphragm chamber 183 in the delay valve device 173 and thence through pipe 27 to the brake cylinder compensating chamber 24. As fluid under pressure then continues to be supplied to the main brake cylinder chamber 18 the load compensating device 8 will operate to proportionally increase the pressure in the compensating chamber 24 in accordance with the position of the roller 64, but it will be noted that due to the one to three ratio of the leverage arms of beam 41 the increase in pressure in chamber 18 will be at a faster rate than in chamber 24, and the apparatus will continue to function as just described until a sufficient differential between these pressures is developed on the opposite sides of diaphragm 175 in the delay valve device 173 to overcome the opposing force of spring 196, whereupon the diaphragm 175 will be deflected in an upward direction to close the valve 188 and to open the valve 192. With the valve 192 open fluid under pressure will then continue to be supplied to the compensating chamber 24 in accordance with the increase in pressure of fluid in the main pressure chamber 18 of the brake cylinder device up to the maximum degree in the same manner as for a fully loaded car, thus limiting, however, the degree of braking of the half-loaded car to a degree to insure general gathering of slack in a train.

When the delay valve device 173 operates to open the valve 192 as just described, the check valve 200 will be opened to render the timing valve device 174 effective after a chosen interval of time to open chamber 186 in the delay valve device 173 to atmosphere, whereupon the delay valve device 173 will be operated by spring 196 to permit closing of valve 192 and reopening of valve 188, in the same manner as above described. When the valve 188 is thus reopened, communication will be restored between the brake cylinder compensating chamber 24 and chamber 49 of the load compensating device whereupon the pressure of fluid in said compensating chamber will become effective on diaphragm 32 and be adjusted in accordance with the loaded condition of the car and the pressure of fluid in chamber 33 acting on the pilot diaphragm 31.

It will thus be seen that for a substantially half-loaded car the pressure of fluid in the brake cylinder compensating chamber 24 is initially controlled by the compensating device 8 and therefore proportioned to the pressure of fluid provided in chamber 33 on the pilot diaphragm 31. Then when a sufficient differential develops between this pressure and that effective in the main brake cylinder pressure chamber 18 on opposite sides of the diaphragm 175 to overcome spring 196 in the delay valve device 173, the control of the pressure of fluid in the compensating chamber is transferred to said delay valve device. Then after a certain interval of time the timing valve device 174 operates to cause the delay valve device 173 to operate to restore the control of pressure of fluid in the brake cylinder compensating chamber 24 to the load compensating device 8, whereby the pressure of fluid in said chamber will be properly adjusted in proportion to the loaded condition of the car for promptly bringing the car to a stop, after the slack in the train has been completely gathered.

If the car is less than half-loaded then in effecting an emergency application of brakes an insufficient differential between the pressures in the main pressure chamber 18 and compensating pressure chamber 24 of the brake cylinder device, and thereby on opposite sides of diaphragm 175 in the delay valve device 173, will be obtained to deflect said diaphragm against the spring 196 whereby the pressure of fluid in the brake cylinder compensating chamber 24 will remain under the control of the load compensating device 8, i. e., under the control of the pressure of fluid in chamber 33 acting on the pilot diaphragm 31.

From the foregoing description it will now be noted that the operation of the equipment when the car is empty, as well as when loaded up to some chosen degree, upon an emergency reduction in brake pipe pressure is substantially the same as the equipment disclosed in the aforementioned Cook et al. copending application, but for any greater degree of load the development of braking power by the brake cylinder device 6 is initially so regulated by the delay valve device 173 as to retard the development of and limit to a degree less than maximum the braking power provided by said brake cylinder device for a period of time sufficient to cause gathering of slack in the train without damaging shock, following which the braking power of the brake cylinder device is promptly increased to its emergency degree to stop the car.

When a service rate of reduction in pressure is effected in brake pipe 2 for effecting a service application of brakes, the brake pipe pressure remaining effective in diaphragm chamber 196 of the delay valve device 173, maintains the parts thereof in the position in which they are shown in the drawing, so that the pressure of fluid in the brake cylinder compensating chamber 24 remains constantly under control of the load compensating device 8, the same as in the Cook et al. copending application hereinbefore referred to.

*Description—Fig. 3*

In this embodiment of the invention a control valve device 218, constituting a combined delay valve device and timing valve device, is associated with the load compensating device 8 in place of the delay valve device 173 and timing valve device 174, shown in Fig. 1 of the drawing.

The control valve device 218 comprises a casing containing two spaced apart and coaxially aligned flexible diaphragms 219 and 220 which are clamped around their edges in the casing. At the outer face of diaphragm 219 is a chamber 221 open to a timing chamber 222, while at the outer face of diaphragm 220 is a chamber 223 open to a timing chamber 224. Between the two diaphragms is a chamber 225 which may be open to atmosphere by way of a port 226. Extending through the chamber 225 is a stem 227 having at each of its opposite ends a follower 228, the two followers engaging the adjacent faces of the two diaphragms 219 and 220. A bias spring 229 in chamber 223 acts on the diaphragm 220 for urging said diaphragm, stem 227 and diaphragm 219 to the position in which they are shown in the drawing defined by contact between the latter diaphragm and a wall of the casing. The two diaphragms 219 and 220 and stem 227 are movable in the opposite direction against spring 229 to another position defined by contact between diaphragm 220 and another wall of the casing.

A slide valve 230 contained in chamber 225 is disposed in a recess in stem 227 for movement therewith. Connected to the seat of slide valve 230 is a passage 231 from the timing chamber 222, a passage 232, an atmospheric passage containing a choke 233, a passage 234 connected to the release valve chamber 49 of the load compensating device, a passage 235 connected to pipe 27 leading to the compensating pressure chamber 24 in the brake cylinder device 6, and a passage 236 leading to a valve chamber 237, through a choke 238. The slide valve 230 has two cavities 239 and 240 for establishing different communications between various pairs of the passages just described, as will be set forth in detail hereinafter.

The passages 234 and 235 are connected by a communication containing a check valve 241 so arranged as to permit flow of fluid in the direction from passage 234 to passage 235 but to prevent flow in the opposite direction. The passage 232 leads to a valve chamber 242 containing a valve 243 arranged to control communication between said chamber and a passage 244 leading to the auxiliary reservoir 3. The valve 243 is provided on one end of a stem 245 which is slidably mounted in a suitable bore through a partition in the casing separating chamber 242 from a chamber 246 which latter chamber is open to atmosphere through a port 247. The chamber 246 is provided at one side of a flexible diaphragm 248 which is clamped around its edge in the casing and which is engaged within chamber 246 by an enlarged end of stem 245. At the opposite side of diaphragm 248 is a pressure chamber 249 which is connected by a passage 250 to passage 34 of the load compensating device, the latter passage being connected by pipe 35 to the brake cylinder pipe 11 and thus to the usual pressure chamber 18 in the brake cylinder device 6. A spring 251 in chamber 246 bears against the enlarged end of stem 245 for urging said stem in a direction to open valve 243.

The valve chamber 237 contains a poppet valve 252 arranged to control communication between said chamber and a chamber 253 which is connected by a passage 254 to passage 61 in turn connected to pipe 62 leading to the load reservoir 7. A spring 255 contained in valve chamber 237 acts on the valve 252 with a chosen degree of force urging said valve to a closed position.

In this embodiment of the invention the bias piston 77 of the load compensating device 8 is provided with a rod 256 differing from the rod 74 shown in Fig. 1 only in being longer and being provided in one side with a notch 257. The rod 256 cooperates with other parts of the load compensating device 8 in the same manner as in the embodiment shown in Fig. 1. Depending from the poppet valve 252 through a suitable bore in the casing and into a recess 258 therein is a stem 259. In recess 258 the stem 259 is provided with a collar 260 against which bears one end of a spring 261. The opposite end of spring 261 bears against a plunger 262 which is slidably mounted in recess 258 directly over the bias piston rod 256. In the empty position of the fulcrum roller 64 and in all positions therebetween and the position which said roller will assume for a substantially half loaded car, the plunger 262 will engage the top of the bias piston rod 256 at the right hand side of the notch 257 but in all other positions of the fulcrum roller 64 the notch 257 will be disposed under the plunger 262 to permit movement of said plunger into said notch. With the plunger 262 engaging the bias piston rod 256 outside of the notch 257 the spring 261 will be compressed to a degree which will maintain valve 252 seated against pressure of fluid from the load reservoir 7 acting in chamber 253. However, when the rod 256 is positioned to permit the plunger 262 to drop into notch 257 the spring 261 will expand to a degree where it will exert substantially no pressure on the rod 259 and thereby on the valve 252.

The timing chamber 224 is open to the brake pipe 2 through a choke 263, passage 264, passage 152 and thence through pipe 153.

*Operation—Fig. 3*

In operation, let it be assumed that the fulcrum roller 64 is adjusted to its full load position permitting movement of the plunger 262 into the notch 257, and let it further be assumed that the equipment is being initially charged with fluid under pressure. With the brake controlling valve device 1 in the position assumed during charging of the equipment, the pipe 35 will be open to atmosphere through the brake cylinder pipe 11; pipe 27, connected to the compensating pressure chamber 24 in the brake cylinder device 6, will be open to atmosphere past the open release valve 53 of the load compensating device 8; the auxiliary reservoir 3 will be charged with fluid under pressure; and pipe 62 and the connected load reservoir 7 will be charged with fluid under pressure, as well as pipe 153 connected to the brake pipe 2, in the same manner as hereinbefore described. Since the timing chamber 224 and chamber 223 are open through choke 263 and passages 264 to pipe 153 connected to the brake pipe, said chambers will become charged to the same pressure as in the brake pipe. With these chambers charged with fluid at brake pipe pressure, spring 229 will hold the diaphragms 220 and 219, and thereby the slide valve 230 in the position in which they are shown in the drawing.

With the slide valve 230 in this position the cavity 239 therein connects passages 231 and 232 thereby establishing communication between chambers 221 and 222 and the valve chamber 242 which is open past the open valve 243 to passage 244 and thus to the auxiliary reservoir 3, whereby said chambers will become charged with fluid at the pressure in the auxiliary reservoir. Also in this position of the slide valve 230 the cavity 240 therein establishes communication between passages 234 and 235.

With the plunger 262 in the notch 257 pressure of fluid from the load reservoir 7 acting in chamber 253 will unseat the check valve 252 against spring 255 and flow to chamber 237 and thence through choke 238 and passage 236 to the seat of slide valve 230. With the slide valve 230 in the position in which it is shown in the drawing the end of passage 236 is lapped. Fluid under pressure will therefore continue to flow past the check valve 252 to chamber 237 until the pressure of fluid in said chamber plus that of spring 255 acting on check valve 252 slightly overbalances the opposing pressure of fluid in chamber 253 acting on said check valve whereupon the spring 255 will close said check valve. The check valve 252 and spring 255 therefore act in the capacity of a reducing valve for limiting the pressure of fluid in chamber 237 to a certain degree less than in the load reservoir, for example, to substantially the same pressure as obtained in the compensating pressure chamber 24 of the brake cylinder device 6 by operation of the delay valve device 173 shown in Fig. 1 of the drawing when the fulcrum roller 64 is in its full load position.

Upon an emergency reduction in pressure in the brake pipe 2 for effecting an emergency application of brakes, fluid under pressure will flow to the usual pressure chamber 18 in the brake cylinder device 6 in the same manner as before described. At the same time as the brake pipe pressure reduces, the pressure of fluid in timing chamber 224 and diaphragm chamber 223 will reduce to the brake pipe through choke 263, passage 264 and pipe 153, the flow capacity of this choke being so related to the volume of said timing and diaphragm chambers as to permit a sufficient reduction in pressure to occur therein to enable auxiliary reservoir pressure acting in chamber 221 to deflect the diaphragm 219 and thereby move the stem 227, slide valve 230 and the diaphragm 220 to their right hand position at substantially the time the pressure of fluid in the usual brake cylinder pressure chamber 18 is increased to the chosen degree (25 pounds) at which the delay valve device 173, shown in Fig. 1 in the drawing, operates against spring 196 on a fully loaded car.

With the slide valve 230 in its right hand position cavity 240 therein establishes communication between passages 236 and 235 whereupon fluid under pressure will flow from the load reservoir 7 past the valve 252 and thence through choke 238 and said passages to pipe 27 leading to the compensating pressure chamber 24 in the brake cylinder device. The flow capacity of choke 238 is such as to permit the pressure of fluid in the compensating pressure chamber 24 of the brake cylinder device to increase generally in proportion to the increase in pressure in the usual pressure chamber 18 by operation of the "AB" valve 1, and spring 255 will act to seat the valve and thereby limit the maximum pressure obtained in the brake cylinder compensating chamber to a chosen degree less than in the usual pressure chamber corresponding substantially to the maximum pressure of fluid obtained in the compensating pressure chamber 24 by operation of the delay valve device 173 in a structure shown in Fig. 1, when the fulcrum roller 64 thereof is in its full load position.

In the right hand position of the slide valve 230 communication between the timing chamber 222 and the auxiliary reservoir 3 is closed and said chamber is connected through passage 231, cavity 239 in said slide valve and to atmosphere through choke 233 so that the pressure of fluid in said chamber and in chamber 221 gradually reduces to atmosphere. After a certain period of time, sufficient for the slack in the train to completely gather, and therefore corresponding substantially to the time of operation of the timing valve device 174 in the structure shown in Fig. 1, the pressure of fluid in chambers 222 and 221 will become sufficiently reduced for spring 229 to move the diaphragms 220 and 219 and thereby the slide valve 230 back to the position in which it is shown in the drawing, thereby intercepting the communication between passages 236 and 235 and connecting passage 235 to 234 whereby the brake cylinder compensating chamber 24 is reconnected to the release valve chamber 49 of the load compensating device 8. The release valve 53 in the load compensating device 8 being opened with the fulcrum roller 64 in full load position, fluid under pressure in the brake cylinder compensating chamber 24 will then be vented to atmosphere whereby the pressure of fluid in the usual pressure chamber 18 of the brake cylinder device 17 will be rendered fully effective to provide the maximum degree of braking force on the car as required when fully loaded.

As fluid under pressure is supplied to the usual brake cylinder pressure chamber 18 in the brake cylinder device 6 and through pipe 35 and passage 34 to the pilot diaphragm chamber 33 in the load compensating device 8 in applying the brakes as above described, fluid also flows from passage 34 to diaphragm chamber 249, and when sufficient pressure is obtained in the latter chamber to overcome the opposing force of spring 251 the diaphragm 248 will deflect against said spring to close the valve 243 for thereby closing communication between the auxiliary reservoir and the valve chamber 239. The pressure of spring 251 on the diaphragm 248 may be such as to permit closing of the valve 243 immediately following initiation of the application of brakes and the purpose of closing said valve is to prevent recharging of the chambers 222 and 221 when the parts of the control valve device 218 return to the position in which they are shown on the drawing, from their right-hand position. Otherwise, recharging of chambers 222 and 221 from the auxiliary reservoir would cause the diaphragms 219 and 220 and the slide valve 230 to be moved back to their right-hand positions, for resupplying fluid under pressure to the brake cylinder compensating chamber 24, when not desired. In other words, the closing of valve 243 insures that the diaphragms 222 and 221 and the slide valve 230 will remain in the position in which they are shown in the drawing after having been in their right-hand position.

The control valve device 218 will operate for any degree of load on the car between full-load and substantially half-load in the same manner as above described, except for less than full load the pressure of fluid in the brake cylinder compensating chamber 24 will not be reduced to atmospheric pressure when the timing slide valve 230 returns from its right-hand position to its left-hand position to connect said chamber to the release valve chamber 49 of the load compensating device. For less than full load the pressure in the brake cylinder compensating chamber will be merely regulated according to the adjusted position of the fulcrum roller 64, and hence in accordance with the partial loaded condition of the car, as will be clear from the description of the structure shown in Fig. 1.

For less than a substantially half-load on the car, however, the bias piston 77 will be so positioned as to move the plunger 262 into the notch 257 for increasing the pressure of spring 255 against the valve 252 to a degree sufficient to hold said valve seated against load reservoir pressure in chamber 253. In effecting an emergency application of brakes under this condition the diaphragms 219 and 220 and the slide valve 230 will move to their right-hand position and subsequently to their left-hand position the same as above described, but will have no control over supply of fluid to the brake cylinder compensating chamber 24 since the valve 252 is held seated, but fluid at the pressure corresponding to the adjusted position of the fulcrum ruler 64 will be supplied to said chamber by way of the supply valve 60 in the load compensating device 8, thence through passage 38, past the check valve 241 and through passage 27, whereby the pressure of fluid in said chamber will be adjusted according to the loaded condition of the car.

When the car is less than fully loaded, but more than half-loaded, the pressure of fluid supplied by the load compensating device 8 to passage 38 and thence to the underside of check valve 241 will be less than supplied past the valve 252 to passage 236 and thence to passage 235 and to the top of said check valve, so that the latter pressure will act to hold said check valve seated and prevent interference in the control of the pressure of fluid in the brake cylinder compensating chamber 24 by operation of the load compensating device 8.

In effecting a service application of brakes, brake pipe pressure remaining effective in diaphragm chamber 223 and timing chamber 224 in diaphragm 220 plus the pressure of spring 229, will maintain the parts of the control valve device 218 in the position in which they are shown in the drawing against reduced or reducing auxiliary reservoir pressure in chamber 221 and 222 so that control of the pressure of fluid in the brake cylinder compensating chamber 24 remains under control of the load compensating device 8, the same as in the Cook et al. copending application hereinbefore referred to.

*Description—Fig. 4*

According to this embodiment of the invention I associate with the load compensating device 8 a control valve device 265 comprising a valve 266 contained in a chamber 267 which is connected by pipe 27 to the brake cylinder compensating chamber 24. The valve 266 is connected by a stem 268 to a sleeve 269 slidably mounted in a bore in the casing. A bore through the valve 266 and stem 268 connects chamber 267 to a larger bore 270 in the sleeve 269 in which larger bore is slidably mounted the fluted stem of a valve 271 contained in a chamber 272 and arranged to seat on the end of said sleeve for closing communication between said chamber and chamber 267. Encircling the valve stem 268 is an annular chamber 273, the valve 266 being adapted to control communication between said chamber and chamber 267. Chamber 273 is connected through a choke 274 to a chamber 275 containing a check valve 276 arranged to prevent flow of fluid under pressure in the direction from chamber 275 to a passage 277 which is connected to the load reservoir pipe 62, but to permit flow in the opposite direction. A spring 278 in chamber 275 acts on the check valve 277 with a chosen degree of force, said check valve and spring corresponding in function and operation to the valve 252 and spring 255 in the structure shown in Fig. 3 of the drawing. A spring 279 in chamber 267 acts on the valve 266 for urging it to its seated position.

The control valve device 261 further comprises a flexible diaphragm 280 clamped around its periphery in the casing and having at one side a chamber 281 open through a passage 282 to a pipe 283, said passage being also open through a choke 284 and a passage 285 to a timing chamber 286. A diaphragm follower 287 engages the opposite side of the diaphragm 280 and has a stem 288 extending through a chamber 289 at said opposite side of the diaphragm and through a bore in a partition wall 290 into chamber 272. The stem 288 has a head 291 and hooked over this head is a finger 292 projecting from the valve 271 whereby movement of the stem 288 in a direction away from said valve will unseat said valve from sleeve 269. A spring 293 contained in chamber 289 acts against follower 287 for urging same and the diaphragm 280 to the position shown on the drawing in which the valve 271 is opened by said stem and the valve 266 is closed by spring 279. A shoulder 294 is provided in the casing for engagement by follower 287 to limit deflection of diaphragm 280 in the direction adjacent said follower. Chamber 289 is open to passage 285.

The pipe 283 connected to diaphragm chamber 281 leads to the cut-out valve portion 139 of the load compensating device 8. The slide valve 155 in the cut-out valve portion 139 is provided with a cavity 294 which in the cut-out position of said slide valve, as shown on the drawing, connects pipe 283 to the atmospheric port 159. The slide valve also is provided with a passage 295 which, in the cut-in or left-hand position of the cut-out slide valve 155 is adapted to connect pipe 283 to the load reservoir pipe 62.

In operation, let it be assumed that the equipment is fully charged with fluid under pressure under which condition the main pressure chamber 18 of the brake cylinder device will be open to atmosphere and the parts of the cut-out valve device 139 will be in their cut-out position, in which they are shown on the drawing. In the cut-out position, the diaphragm chamber 281 in the control valve device 265 will be open to atmosphere, as well as timing chamber 286 and spring chamber 289, through pipe 283, the slide valve cavity 295 and atmospheric passage 294. As a result, spring 293 will be urging the diaphragm 280 to the position in which it is shown on the drawing for thereby actuating the stem 288 for unseating the valve 271 from the end of sleeve 269. The valve 266 will then be closed by spring 279. As a result, the brake cylinder compensating chamber 24 connected to pipe 27 will be open through valve chamber 267, the bores in the valve stem 268 and sleeve 269 to chamber 272 and thence to passage 38 in the load compensating device 8, which passage is open to atmosphere past the open release valve 53 in said device. The load reservoir 7, being charged with fluid under pressure, fluid will be supplied therefrom to passage 277 and past the check valve 276 to chamber 273 encircling the valve stem 268, the pressure of fluid in said chamber being less than that in the load reservoir by a degree equal to the pressure of spring 278 on said check valve.

Now assume that the pressure of fluid in brake pipe 2 is vented to atmosphere for effecting an emergency reduction in brake pipe pressure. Upon an emergency reduction in pressure in the brake pipe 2 the the pressure of fluid in the cut-out valve chamber 149 will promptly reduce to the degree at which spring 144 is unable to actuate the diaphragm 140 and the slide valve 155 to its cut-in position. In this position, the cavity 295 in the slide valve establishes communication between the load reservoir pipe 62 and pipe 283 whereupon fluid under pressure from said reservoir promptly equalizes into diaphragm chamber 281 of the control valve device 281, and also flows at a restricted rate through choke 284 into the timing chamber 286 and spring chamber 289 for gradually charging said chambers with fluid under pressure. The pressure of fluid thus obtained in chamber 281 promptly deflects diaphragm 280 against spring 293 for seating the valve 271 against the sleeve 269 and for then actuating said sleeve to unseat the valve 266. The closing of valve 271 closes communication between the load compensating device 8 and pipe 27 leading to the brake cylinder compensating chamber 24, while the opening of valve 266 connects said chamber by way of the latter pipe to chamber 273 encircling the valve stem 268. Fluid under pressure from the load reservoir pipe 62 will then flow through passage 277 past the check valve 276 and through choke 274 to chamber 273 and thence past the valve 266 to chamber 267 from whence it will flow through pipe 27 to the load compensating pressure chamber 24 in the brake cylinder device 6. The choke 274 so restricts this flow of fluid under pressure to the brake cylinder compensating chamber 24 as to provide an increase in pressure in said chamber generally parallel to that provided in the usual pressure chamber 18 by operation of the "AB" valve device 1, while the spring 278 acting on the check valve 276 is adapted to coact with the pressure of fluid in chamber 275 to seat said check valve, when the pressure of fluid in the brake cylinder compensating chamber 24 is increased to a degree substantially the same as permitted by spring 252 in the structure shown in Fig. 3, or by spring 196 in the delay valve device 173 in the structure shown in Fig. 1.

While fluid under pressure is being supplied to the compensating chamber 24 in the brake cylinder device, as just described, fluid under pressure from the load reservoir is also flowing from passage 282 through choke 284 into the timing chamber 286 as well as into chamber 289 below the diaphragm 280. The flow capacity of choke 284 is so related to the combined volumes of chamber 286 and 289 that after a certain lapse of time from initiating the supply of fluid under pressure to pipe 283 a sufficient pressure will be obtained in chamber 289, which acting with spring 293, will overcome the opposing pressure of fluid in diaphragm chamber 281 and return the diaphragm 280 to the position in which it is shown on the drawing. This time elapse is such as to insure a complete gathering of slack in the train, and therefore corresponds substantially to the time which diaphragms 219 and 220 and the slide valve 230 in the structure shown in Fig. 3 remain in their right-hand position before they are returned to their left-hand position, or the time elapse between initiating an emergency reduction in brake pipe pressure and return of the parts of the timing valve device 174 of the structure shown in Fig. 1 of the drawing to their right-hand position.

When the diaphragm 280 of the control valve device 265 is returned to its upper position it unseats the valve 271 and permits closing of valve 266 by spring 279. The closing of valve 266 closes communication between the load reservoir and the brake cylinder compensating chamber 24 by way of check valve 277 and connects said chamber past the open valve 271 to chamber 272 and thence by way of passage 38 to the release valve chamber 49 in the load compensating device 8. If the car is fully loaded, the release valve 53 in the load compensating device 8 will be open so that fluid under pressure will be vented from the brake cylinder compensating chamber 24 to atmosphere to thereby render the pressure of fluid in the usual pressure chamber 18 effective to actuate piston 19 to provide the high degree of braking required for the fully loaded car. However for any degree of load less than full-load down to and including the empty car, the connecting of the load compensating pressure chamber 24 in the brake cylinder device to the release valve chamber 49 in the load compensating device 8 will render said compensating device effective to promptly adjust the pressure of fluid in said compensating chamber according to the loaded condition of the car, for thereby limiting the effectiveness of the brake cylinder piston 18 to a degree proportional to the weight of the car, whether empty or loaded, and as limited by the pre-adjusted position of the fulcrum roller 64.

In this embodiment the control valve device 265 will operate, as just described, regardless of the weight of the car, that is, it will operate the same if the car is empty as if fully loaded, in contrast with the structure shown in Figs. 1 and 3 of the drawings where corresponding control of pressure of fluid in the compensating chamber of the brake cylinder device is limited to from a full-load position to a substantially half-loaded position of the fulcrum roller 64.

The cut-out valve device 139 remains in its cut-out position in which it is shown in the drawing upon a service reduction in brake pipe pressure, whereby the parts of the control valve device 265 will remain in the position in which they are also shown, so that when a service application of brakes is effective said control valve device will have no control over such an application, and said control will be entirely by the load compensating device 8, the same as in the Cook et al. application above referred to.

Summary

It will now be seen that I have provided means adapted to be associated with the load compensating brake equipment disclosed in the aforementioned Cook et al. copending application for so regulating an emergency application of brakes on a railway car as to insure gathering of slack in a train of such cars without development of damaging shock upon effecting an emergency application of brakes. The regulating means consists of structure for initially limiting the braking force obtained on the car of a train to the proper degree for gentle gathering of slack and operates automatically after a period of time required for substantial complete gathering of train slack to transfer the control of braking force to the load compensating device which then effects adjustment of such force to the loaded condition of the car, whereby prompt stopping of the train will then occur. The control means may be of a type such as illustrated in Figs. 1 and 3 of the drawing and therefore operative only when the load carried by the car exceeds a certain degree, such as half-load, or if desired, it may be of the nature of the structure shown in Fig. 4 which operates the same for all degrees of car load as well as when the car is empty, although the need for regulation is greatest when the car is fully loaded and actually may not be required for an empty or relatively lightly loaded car.

Having now described my invention, what I claim as new and desire to secure by Letters Patent, is:

1. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said chambers, and control means comprising valve means operative upon a reduction in brake pipe pressure to supply fluid under pressure to the other of said chambers, and means operative a chosen interval of time after said operation of said control means, to cut off the supply of fluid under pressure to said other chamber and to open a fluid pressure release communication therefrom.

2. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said chambers, control means comprising valve means for controlling supply and release of fluid under pressure to and from the other of said chambers, actuating means operative only upon an emergency reduction in pressure in said brake pipe to effect operation of said valve means to supply fluid under pressure to said other chamber, means operative, a chosen interval of time after said operation of said actuating means to effect operation of said valve means, to cut off the supply of fluid under pressure to said other chamber and to open a fluid pressure release communication from said other chamber, and means for proportioning the rate of supply of fluid to and the pressure of fluid obtained in said other chamber to the rate of supply to and the pressure of fluid obtained in said one chamber.

3. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said chambers, control means comprising valve means for controlling supply and release of fluid under pressure to and from the other of said chambers, a spring, actuating means adapted to be subjected in a third chamber to pressure of fluid in said one chamber acting in opposition to pressure of fluid in said other chamber plus pressure of fluid in said brake pipe and of said spring and operative by fluid under pressure in said third chamber upon an increase therein to overcome the opposing pressures, to supply fluid under pressure to said other chamber at a rate and to a pressure proportional to the rate of supply and degree of pressure in said one chamber, means operative by pressure of fluid in said other chamber upon release of fluid under pressure from said third chamber to establish a fluid pressure release communication from said other chamber, and timing means normally establishing communication between said one and third chambers and operative a chosen interval of time after said operation of said actuating means to close said communication and to release fluid under pressure from said third chamber.

4. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said chambers, control means comprising valve means for controlling supply and release of fluid under pressure to and from said other chamber, spring means, two connected movable abutments for controlling said valve means, one of said abutments being subject on one side to pressure of fluid in a third chamber acting in opposition to pressure of fluid in said other chamber on the opposite side, plus brake pipe pressure and the pressure of said spring means acting on the other abutment and being operative by pressure of fluid in said third chamber upon a preponderance thereof over the opposing pressures, upon an emergency reduction in brake pipe pressure, to actuate said valve means to supply fluid to said second chamber at a pressure proportional to the pressure in said one chamber and operative by said opposing pressures upon release of fluid under pressure from said third chamber to open a fluid pressure release communication to said other chamber, timing means comprising a valve, means operative upon an increase in pressure of fluid in a timing chamber to actuate said valve to connect said third chamber to said first chamber, means operative upon a chosen reduction in pressure of fluid in said timing chamber to actuate said valve to disconnect said third chamber from said one chamber and to release fluid under pressure from said third chamber, a check valve in a fluid pressure supply communication from said brake pipe to said timing chamber, means operative by said control means upon an emergency reduction in pressure in said brake pipe to open said check valve for releasing fluid under pressure from said timing chamber to said brake pipe, and choke means in the fluid pressure release communication from said timing chamber for providing said chosen reduction in pressure of fluid in said timing chamber a chosen interval of time after opening said check valve.

5. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said brake cylinder pressure chambers, valve means for supplying fluid under pressure to the other brake cylinder pressure chamber and for establishing a fluid pressure release communication from said other brake cylinder pressure chamber, spring means, movable abutment means subject to pressure of said spring means and of fluid in a first timing chamber open to said brake pipe and to opposing pressure of fluid in a second timing chamber normally charged with fluid under pressure, and operative by pressure of fluid in said second timing chamber upon a reduction in pressure of fluid in said first timing chamber in response to an emergency reduction in brake pipe pressure, to effect operation of said valve means to supply fluid under pressure to said other brake cylinder pressure chamber, said valve means being operative upon operation to supply fluid under pressure to said other brake cylinder pressure chamber to also release fluid under pressure from said second timing chamber, and means for restricting said release of fluid under pressure from said second timing chamber to render said spring means effective to actuate said valve means to cut off the supply of fluid under pressure to said other brake cylinder pressure chamber and to release the fluid pressure therefrom a chosen interval of time after initiating said emergency reduction in brake pipe pressure.

6. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said brake cylinder pressure chambers, valve means for supplying fluid under pressure to said other brake cylinder pressure chamber and for establishing a fluid pressure release communication therefrom, means for proportioning the rate of said supply of fluid under pressure to and the degree of pressure obtained in said other brake cylinder pressure chamber to the pressure of fluid in said one brake cylinder pressure chamber, spring means, movable abutment means subject to pressure of said spring means and of fluid in a first timing chamber open to said brake pipe and to opposing pressure of fluid in a second timing chamber, and operative by pressure of fluid in said second timing chamber in response to a reduction in pressure of fluid in said first timing chamber upon an emergency reduction in brake pipe pressure to effect operation of said valve means to supply fluid under pressure to said other brake cylinder pressure chamber, choke means for restricting release of fluid under pressure from said first timing chamber upon an emergency reduction in brake pipe pressure to delay for a chosen interval of time after initiating said emergency reduction, the operation of said valve means to supply fluid under pressure to said other brake cylinder pressure chamber, said valve means being operative during operation to supply fluid under pressure to said other brake cylinder pressure chamber to also release fluid under pressure from said second timing chamber, and means for restricting the release of fluid under pressure from said second timing chamber to render said spring means effective to actuate said valve means to cut off the supply of fluid under pressure to said other brake cylinder pressure chamber and to release the fluid pressure therefrom a chosen interval of time after initiating said emergency reduction in brake pipe pressure.

7. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said brake cylinder pressure chambers, a source of fluid under pressure, valve means for supplying fluid under pressure to said other brake cylinder pressure chamber and for establishing a fluid pressure release communication therefrom, spring means, movable abutment means subject to pressure of said spring means and of fluid in a first timing chamber open to said brake pipe acting in opposition to pressure of fluid in a second timing chamber, said movable abutment means being operative by pressure of fluid in said first timing chamber to actuate said valve means to establish a fluid pressure supply communication from said source of fluid under pressure to said second timing chamber for charging said second timing chamber, and being operative by pressure of fluid in said second timing chamber in response to a reduction in pressure of fluid in said first timing chamber, upon an emergency reduction of brake pipe pressure, to effect operation of said valve means to supply fluid under pressure to said other brake cylinder pressure chamber, said valve means being operative upon operation to supply fluid under pressure to said other brake cylinder pressure chamber to also release fluid under pressure from said second timing chamber, means for restricting the release of fluid under pressure from said second timing chamber to render said spring means effective to actuate said valve means to cut off the supply of fluid under pressure to said other chamber and to release the fluid pressure therefrom a chosen interval of time after initiating said emergency reduction in brake pipe pressure, and means operative by fluid under pressure supplied to said one chamber for closing communication between said source of fluid under pressure and said second timing chamber.

8. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said brake cylinder pressure chambers, valve means for supplying fluid pressure to and for establishing a fluid pressure release communication from the other brake cylinder pressure chamber, control means controlled by brake pipe pressure operative upon a reduction in brake pipe pressure to a chosen low degree to effect operation of said valve means to supply fluid under pressure to said other brake cylinder pressure chamber at a rate and to a pressure proportional to the pressure in said one brake cylinder pressure chamber, and means for effecting operation of said valve means to cut off the supply of fluid to and to open a fluid pressure release communication from said other brake cylinder pressure chamber a chosen interval of time after said operation of said control means.

9. A fluid pressure brake equipment for a vehicle comprising in combination, a brake pipe, brake cylinder means having two pressure chambers and operative to provide a braking force on said vehicle in accordance with the pressure of fluid in said chambers, brake controlling means operative upon a reduction in pressure in said brake pipe to supply fluid under pressure to one of said brake cylinder pressure chambers, valve means operable by a differential in opposing fluid pressures to supply fluid under pressure to said other brake cylinder pressure chamber, means operative upon a certain reduction in the degree of said differential to effect operation of said valve means to establish a fluid pressure release communication from said other brake cylinder pressure chamber, control means operative upon an emergency reduction in pressure in said brake pipe to establish said differential in pressures for actuating said valve means, and means for effecting said certain reduction in said differential a chosen interval of time after said operation of said control means.

10. A fluid pressure brake equipment for a vehicle comprising in combination, a brake pipe, a brake cylinder device comprising a piston having on one side a certain area which is subject to pressure of fluid in one chamber and having a reduced area on the opposite side subject to pressure of fluid in a second chamber, and operative to provide a braking force on the vehicle in accordance with the differential in forces developed on opposite sides of said piston by pressure of fluid in said chambers, brake controlling means operative upon a reduction in pressure in said brake pipe to supply fluid under pressure to said one chamber, control means comprising valve means operative upon a reduction in pressure in said brake pipe to supply fluid under pressure to said second chamber, means operative a chosen interval of time after said operation of said control means, to cut off the supply of fluid under pressure to said second chamber and to open a fluid pressure release communication therefrom, and means for limiting the rate of supply of fluid under pressure to and the degree of pressure obtained in said second chamber by operation of said valve means.

11. A fluid pressure brake equipment for a vehicle comprising in combination, a brake pipe, a brake cylinder device comprising a piston having on one side a certain area which is subject to pressure of fluid in one chamber and having a reduced area on the opposite side subject to pressure of fluid in a second chamber, and operative to provide a braking force on the vehicle in accordance with the differential in forces developed on opposite sides of said piston by pressure of fluid in said chambers, an "AB" valve operative upon an emergency reduction in pressure in said brake pipe to supply fluid under pressure to said one chamber, control means operative upon said supply of fluid under pressure to said one chamber to supply fluid under pressure to said second chamber, means for proportioning the rate of supply and the degree of pressure obtained in said second chamber substantially to the rate of supply and pressure in said one chamber, and means operative a chosen interval of time after said operation of said control means to cut off the supply of fluid to said other chamber and to open a fluid pressure release communication therefrom.

12. A fluid pressure brake equipment for a vehicle comprising, in combination, a brake pipe, brake cylinder means having two pressure chambers and operative to produce a braking force on said vehicle in accordance with the pressures of fluid in said chambers, brake controlling means responsive to a reduction in brake pipe pressure to supply fluid under pressure to one of said pressure chambers, control means operative upon a reduction in brake pipe pressure to supply fluid to the other of said chambers at a pressure less than in said one chamber, adjustable means for limiting the pressure of fluid in said other chamber in accordance with the adjustment thereof, means for adjusting said adjustable means in accordance with the weight of said vehicle, and means for rendering said control means ineffective and said adjustable means effective to control pressure of fluid in said other chamber.

13. In a fluid pressure brake for a vehicle, in combination, a brake pipe, brake cylinder means having two pressure chambers and operative to provide braking force on said vehicle in accordance with the pressure of fluid in said chambers, brake controlling means operative upon a reduction in pressure in said brake pipe to supply fluid under pressure to one of said chambers, adjustable load compensating means operable by fluid under pressure in said one chamber to supply fluid to a passage at a pressure proportional to the adjustment thereof and to the pressure in said one chamber, means for adjusting said compensating means according to the weight of the vehicle, valve means controlling communication between said passage and other chamber and operable upon a reduction in brake pipe pressure to close said communication and to supply fluid under pressure to said other chamber, and timing means for effecting operation of said valve means a chosen interval of time after operation thereof to supply fluid under pressure to said other chamber, to cut off such supply and to establish said communication.

14. In a fluid pressure brake for a vehicle, in combination, a brake pipe, brake cylinder means having two pressure chambers and operative to provide braking force on said vehicle in accordance with the pressure of fluid in said chambers, brake controlling means operative upon a reduction in pressure in said brake pipe to supply fluid under pressure to one of said chambers, adjustable load compensating means operable upon supply of fluid under pressure to said one chamber to supply fluid to a passage at a pressure proportional to the adjustment thereof and to the pressure in said one chamber, means for adjusting said compensating means according to the weight of the vehicle, valve means controlling communication between said passage and said other chamber and operative upon an emergency reduction in brake pipe pressure to close said communication and to open a second communication for supplying fluid under pressure to said other chamber, means for limiting the supply of fluid under pressure to said other chamber through said second communication to a rate substantially proportional to the supply of fluid under pressure to said one chamber and for cutting off the supply of fluid under pressure to said other chamber through said second communication at a chosen pressure less than in said one chamber, and timing means for effecting operation of said valve means, a chosen interval of time after operation thereof to open said second communication, to close said second communication and to establish the first mentioned communication.

15. In a fluid pressure brake for a vehicle, in combination, a brake pipe, brake cylinder means having two pressure chambers and operative to provide braking force on said vehicle in accordance with the pressure of fluid in said chambers, brake controlling means operative upon a reduction in pressure in said brake pipe to supply fluid under pressure to one of said chambers, adjustable load compensating means, means for adjusting said compensating means according to the weight of the vehicle, said compensating means being operable upon supply of fluid under pressure to one chamber to vary pressure of fluid in a passage from atmospheric pressure for a maximum loaded weight of the vehicle inversely in proportion to the vehicle weight to a chosen maximum pressure for the empty weight of the vehicle, valve means controlling communication between said passage and other chamber and operable upon an emergency reduction in brake pipe pressure to close said communication and to supply fluid under pressure to said other chamber, means for limiting the supply of fluid under pressure to said other chamber by said valve means to a rate generally proportional to the rate of supply of fluid under pressure to said one chamber and to a chosen degree less than in said one chamber, and timing means for effecting operation of said valve means, a chosen interval of time after operation thereof to supply fluid under pressure to said other chamber, to cut off such supply and establish said communication.

16. In a fluid pressure brake equipment for a vehicle having a load carrying sprung part and an unsprung part, a brake pipe, a brake cylinder device comprising a casing, a piston therein dividing said casing into a main pressure chamber at one side of said piston and a compensating chamber at the opposite side and operative to provide braking force on said vehicle controlled by the difference in forces created by pressure of fluid in said chambers, brake controlling means operative upon a reduction in brake pipe pressure to supply fluid under pressure to said main chamber, a load compensating device comprising an adjustable member and operable upon supply of fluid under pressure to said main chamber to supply fluid to said compensating chamber at a pressure in accordance with the adjustment thereof and the pressure of fluid in said main chamber, adjusting means operable in accordance with the position of said sprung part with respect to said unsprung part to correspondingly adjust said load compensating device, valve means controlling communication between said load compensating device and compensating pressure chamber, means operative upon an emergency reduction in pressure in said brake pipe to effect operation of said valve means to close said communication and to supply fluid under pressure to said compensating pressure chamber, means for limiting the rate of supply of fluid under pressure to said compensating chamber and the maximum pressure obtained therein by said valve means to a degree generally proportional to the pressure provided in said one chamber, and means for effecting operation of said valve means, a chosen interval of time after operation thereof to initiate supply of fluid under pressure to said compensating chamber, to terminate such supply and connect said compensating chamber to said load compensating device.

17. A fluid pressure brake equipment for a load carrying vehicle comprising in combination, a brake pipe, brake cylinder means having two pressure chambers and operative to provide braking force on said vehicle in accordance with the pressure of fluid in said chambers, brake controlling means operable upon a reduction in brake pipe pressure to supply fluid under pressure to one of said chambers, a load reservoir, adjustable load compensating means, mechanism for adjusting said compensating means in accordance with the weight of said vehicle, said compensating means being operative upon supply of fluid under pressure in said one chamber to supply fluid from said load reservoir to a passage at a pressure proportional to the adjustment thereof and to the pressure of fluid in said one chamber, valve means operable upon an emergency reduction in brake pipe pressure to close communication between said other chamber and said compensating means and to supply fluid from said load reservoir to said other chamber, means for limiting the supply of fluid under pressure to said other chamber by operation of said valve means to a rate and degree proportional to that in said one chamber, and timing means operable, a chosen interval of time after operation of said valve means to supply fluid under pressure from said load reservoir to said other chamber, to cut off such supply and to open said communication.

18. A fluid pressure brake equipment for a load carrying vehicle comprising in combination, a brake pipe, brake cylinder means having two pressure chambers and operative to provide braking force on said vehicle in accordance with the pressure of fluid in said chambers, brake controlling means operable upon a reduction in brake pipe pressure to supply fluid under pressure to one of said chambers, a load reservoir, load compensating means comprising an adjustable element, mechanism for positioning said element in accordance with the weight of the vehicle between full-load and empty, said compensating means being operative upon supply of fluid under pressure to said one chamber to supply fluid from said load reservoir to a passage at a pressure proportional to the adjustment of said compensating means and to the pressure of fluid in said one chamber, valve means operable upon an emergency reduction in brake pipe pressure to close communication between said passage and said other chamber and to supply fluid under pressure from said load reservoir to said other chamber, means for limiting the rate of said supply of fluid under pressure to said other chamber to a degree generally proportional to the rate of supply of fluid under pressure to said one chamber, means including a valve for limiting the pressure of fluid obtained in said one chamber by operation of said valve means to a degree less than in said one chamber, timing means operable, a chosen interval of time after operation of said valve means to initiate supply of fluid under pressure from said load reservoir to said other chamber, to cut off such supply and to connect said other chamber to said compensating means, means operable by said member when adjusted to correspond to less than a chosen degree of load on the vehicle to effect operation of said valve to prevent supply of fluid under pressure from said load reservoir to said other chamber by operation of said valve means and to render said valve operative for a greater degree of load on the vehicle, and means including a check valve providing a one-way flow communication between said compensating means and said other chamber by-passing said valve means.

ELLIS E. HEWITT.